United States Patent [19]
Komendowski

[11] 3,919,374
[45] Nov. 11, 1975

[54] METHOD FOR BLOW MOLDING A CONTAINER HAVING AN AUXILIARY COMPONENT FORMED AS AN INTEGRAL PART OF IT

[75] Inventor: Henry Komendowski, Evanston, Ill.

[73] Assignee: Automatic Liquid Packaging, Inc., Elk Grove Village, Ill.

[22] Filed: Apr. 23, 1973

[21] Appl. No.: 353,301

[52] U.S. Cl. ............... 264/90; 53/140; 264/96; 264/98; 264/274; 264/278; 425/DIG. 207; 425/DIG. 214
[51] Int. Cl. ............... B29c 17/07; B65b 3/02
[58] Field of Search ............ 264/89, 90, 92, 93, 94, 264/96, 97, 98, 99, 274, 275, 278, 248, 249, 296, DIG. 78; 425/DIG. 214, DIG. 207; 53/140

[56] References Cited
UNITED STATES PATENTS

| | | | |
|---|---|---|---|
| 2,991,500 | 7/1961 | Hagen | 264/98 X |
| 3,281,283 | 10/1966 | Ralph | 264/94 X |
| 3,358,062 | 12/1967 | Lemelson | 264/96 |
| 3,705,931 | 12/1972 | Confer et al. | 264/98 X |

Primary Examiner—Jan H. Silbaugh
Attorney, Agent, or Firm—Dominik, Knechtel, Godula & Demeur

[57] ABSTRACT

In accordance with the invention, a parison in the form of an elongated hollow tube is extruded between the mold halves of a split mold. The split mold is provided with a container-forming cavity and a second cavity which is disposed beneath the container cavity and arranged to receive therein the auxiliary component, such that the auxiliary component is molded as a part of the container once the parison has been blown and the split cavity opened. For example, in the illustrated embodiment, a plug attachment which may be of a rubber is introduced into the second cavity, the parison extruded about the plug attachment, and the split mold closed. The parison then is blown to form the container, and the plug attachment, when the container is removed from the mold, is molded as a part of the container. As more fully described below, the container may also be filled and sealed before it is removed from the mold, thus providing a completely sterile product within the container.

1 Claim, 12 Drawing Figures

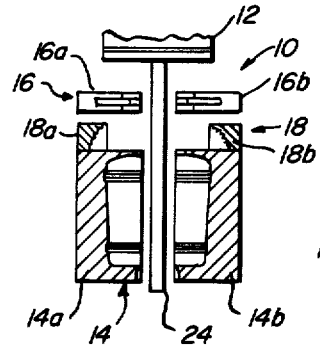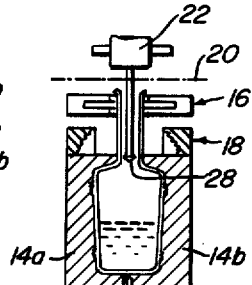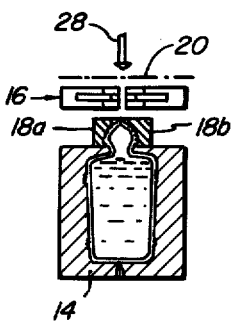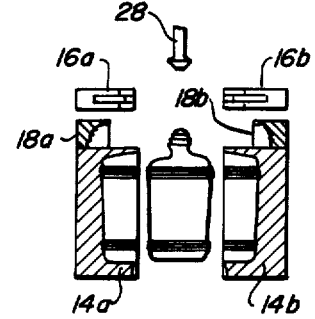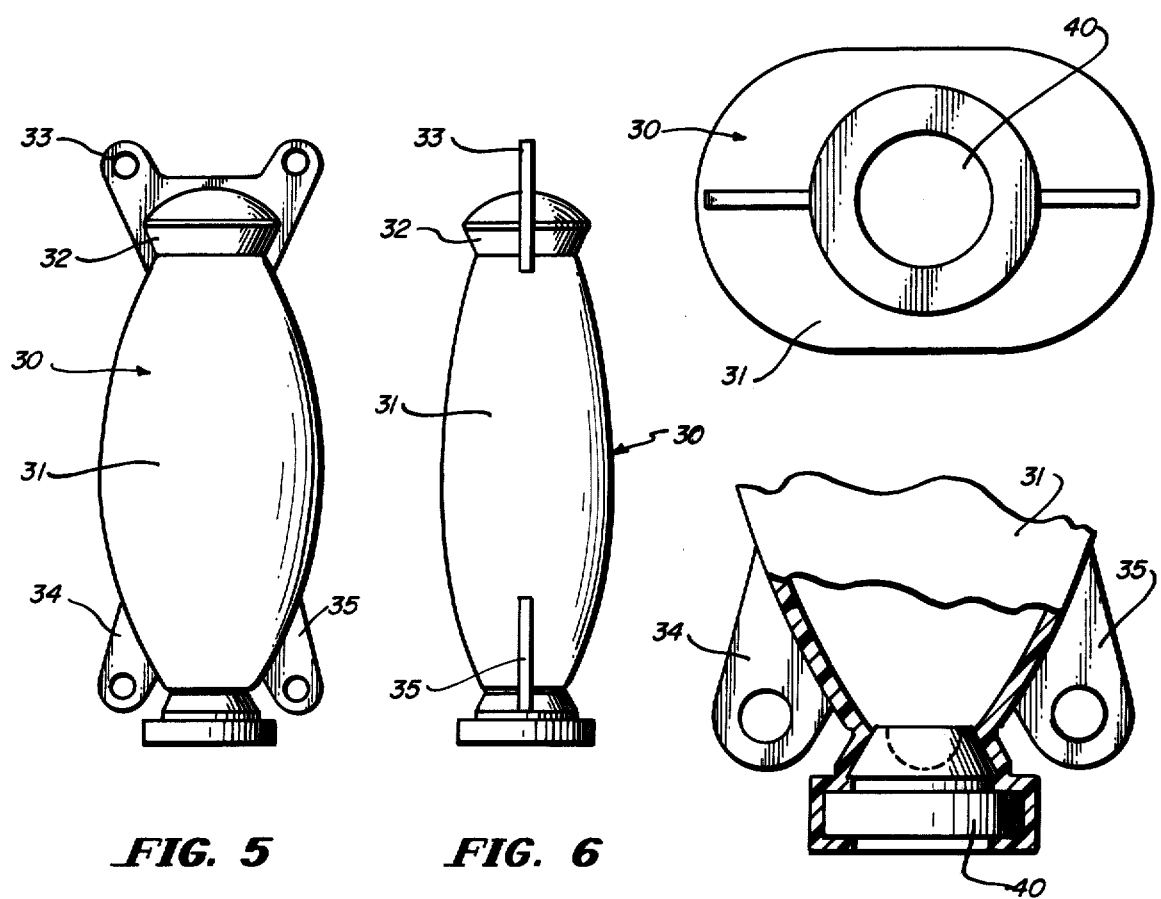

METHOD FOR BLOW MOLDING A CONTAINER HAVING AN AUXILIARY COMPONENT FORMED AS AN INTEGRAL PART OF IT

This invention relates, in general, to a method of blow molding a container and, more particularly, to an improved method for blow molding an article having an auxiliary component forming an integral part of the article.

Many types of articles, particularly containers, presently are blow molded. Furthermore, in many cases, the blown articles have an auxiliary component affixed in some suitable fashion in or to the article. Normally, these auxiliary components are affixed during subsequent operations, after the article has been blown. The subsequent operations many times are extremely time consuming and, therefore, increase substantially the cost of fabricating the completed article. Further still, when filling articles or products with which sterility is a factor, it is extremely difficult, if not impossible, to maintain acceptable control or standards.

Accordingly, it is an object of the present invention to provide an improved method for blow molding a container having an auxiliary component formed as an integral part of the container.

Other objects of the invention will in part be obvious and will in part appear hereinafter.

In accordance with the method of the invention, a parison in the form of an elongated hollow tube is extruded between the mold halves of a split mold. The split mold is provided with a container-forming cavity and a second cavity which is disposed beneath the container cavity and arranged to receive therein the auxiliary component, such that the auxiliary component is molded as a part of the container once the parison has been blown and the split cavity opened. For example, in the illustrated embodiment, a plug attachment which may be of rubber is introduced into the second cavity, the parison extruded about the plug attachment, and the split mold closed. The parison then is blown to form the container, and the plug attachment, when the container is removed from the mold, is molded as a part of the container. As more fully described below, the container may also be filled and sealed before it is removed from the mold, thus providing a completely sterile product within the container.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGS. 1–4 are partial sectional views generally illustrating the manner in which a container is formed, filled and sealed;

FIGS. 5–7 are front, side and bottom views of a container having an auxiliary component formed as an integral part of it, in accordance with the present invention;

FIG. 8 is a partial front view, partially sectionalized, illustrating the plug attachment integrally molded as a part of the container of FIGS. 5–7;

Similar reference characters refer to similar parts throughout the several views of the drawings.

Figure 9:
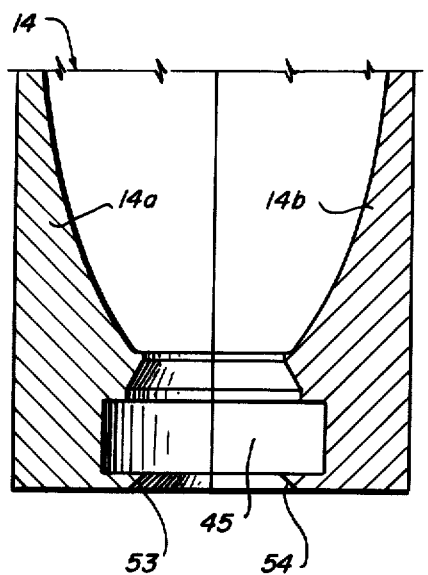
FIGS. 9–12 are views generally illustrating the manner in which the container of FIGS. 5–7 is formed, filled and sealed with the plug attachment being integrally molded as a part of the container.

Referring now to the drawings, in FIGS. 1–4, there is illustrated apparatus 10 for blowing, filling and hermetically sealing a container. This apparatus 10 is generally like that disclosed in U.S. Pat. No. 3,325,860, to Gerhard Hansen, and includes an extruder 12, a two-piece mold 14 including mold halves 14a and 14b, a holding jaw 16 including jaw halves 16a and 16b, a head jaw 18 including jaw halves 18a and 18b, a cutting apparatus 20, and a composite filling and blowing tube 22. For a full and detailed description of the apparatus 10, reference can be made to the above-mentioned U.S. Pat. No. 3,325,860. Generally, however, the operation is as follows. A parison 24 in the form of a hollow tube is extruded by the extruder 12, between the mold halves 14a and 14b. When the parison 24 is of the required length, the mold halves 14a and 14b are closed. The lower end of the parison 24 is pinched closed by the mold, and its upper end is positioned and held by the holding jaw 16, through the application of vacuum applied thereto, and is separated by the cutting apparatus 20, which may be a heated wire.

To fill the container, the mandrel 28 of the composite filling and blowing tube 22 moves into the conical neck part 26, and the hot plastic parison 24 is inflated by a burst of compressed air and pressed against the walls of the mold 14. At the same time, a precisely metered quantity of the product being bottled fills the container via a filling channel (not shown) in the mandrel 28 by a precise metering machine (not shown). The air used for inflating or blowing the container is discharged to the outside through an air discharge duct (not shown). As soon as the product hits the plastic walls, the container solidifies.

The mandrel 28 is raised, and the jaw halves 18a and 18b of the head jaw 18 are closed by means of two cylinders (not shown). The head jaw 18 forms and seals the upper container head, and thereafter the mold 14, the head jaw 18 and the holding jaw 16 all open. The filled and hermetically sealed containers leave the apparatus via a container drop out chute (not shown).

The entire operation takes about as much time as the conventional blow molding of an empty plastic container, hence it is apparent that numerous advantages are provided. The complete packaging cycle can be kept sterile so that the system can be used in the pharmaceutical industry, as well as in other industries, to package or bottle items such as fruit juices, edible oils, vinegar, milk, laundry or dishwashing detergents, floor care liquids, cleansers, dyes, machine oils, bubble baths and shampoos, to mention but a few of a whole host of items which can be bottled. Many thermoplastic materials can be used including low and high density polyethylene, including MPEP 212 polyethylene, produced by Monsano, polypropylene, polycarbonate acetate, and GION and ABS, so that virtually any type of flowable product can be packaged or bottled, in a compatible material.

In FIGS. 5–8, there is illustrated a container 30 having a body portion 31 and a neck portion 32 with an end closure thereon for effectively sealing the container. A hanger 33 is formed on the top of the container and hangers 34 and 35 are laterally disposed and integrally molded with the body portion 31 at its lower end. A plug attachment 40, which can be best seen in FIGS. 7 and 8, which may be of rubber, for example, is molded as a part of the container.

In accordance with the present invention, an auxiliary component such as the plug attachment 40 is integrally molded as a part of the container, during the forming, filling and sealing of the container, as more particularly described above. The manner in which this is accomplished can be seen in FIGS. 9–12, wherein only a portion of the molding apparatus is illustrated for the sake of clarity.

The molding apparatus may be like the molding apparatus 10 described above, except that a second cavity 45 is provided in the mold 14, beneath the main cavity in which the container per se is formed. This second cavity 45 generally conforms in shape and size to the plug attachment 40, and receives the latter therein, as more particularly described below.

Figure 10:
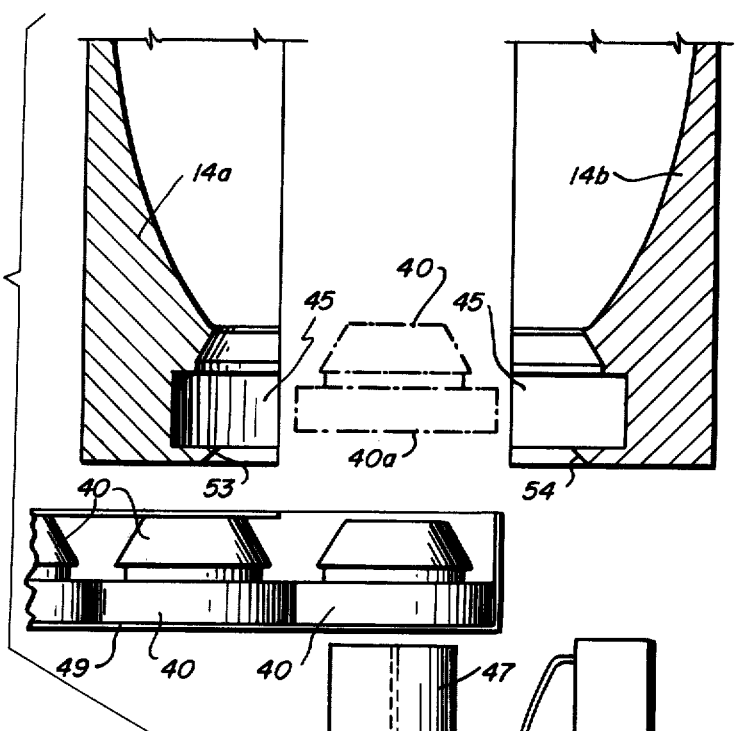
Figure 11:
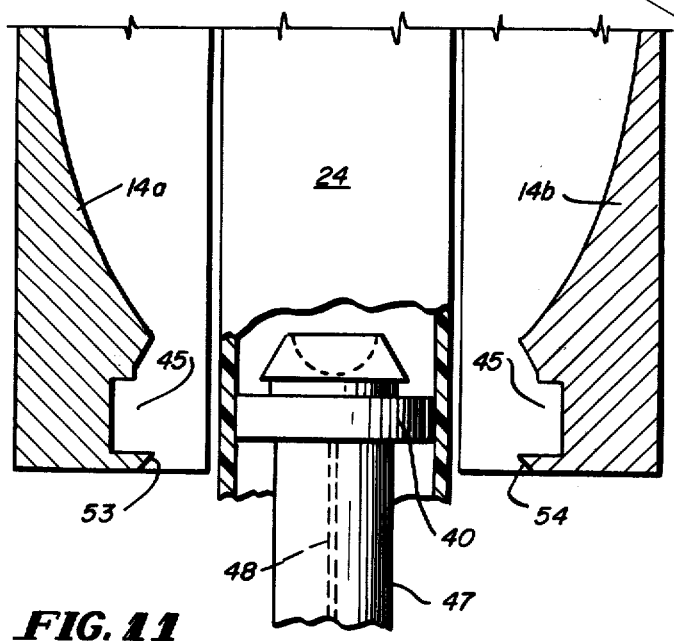
Figure 12:
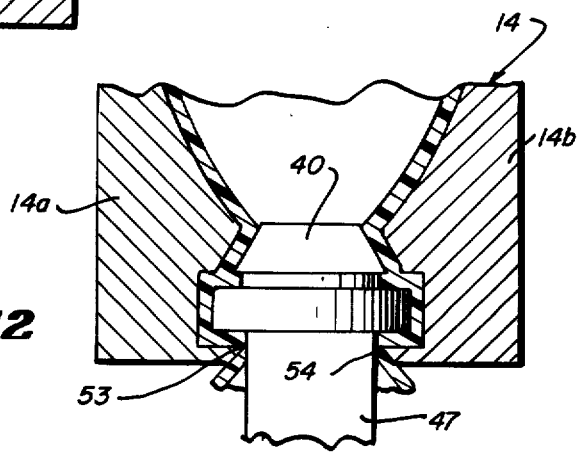

As can be seen in FIGS. 10–12, the plug attachment 40 is seated atop a pin 47 which is generally smaller in diameter than the base portion 40a of the plug attachement 40. The pin 47 is formed to support the plug attachment 40 in position atop of it, using a double-sided adhesive tape or the like, or by means of a pocket formed in it. Preferably, however, the plug attachment is held in position by means of vacuum applied to a bore 48 extending through the pin. In practice, the plug attachments 40 may be fed into position over the top of the pin 47, via conveyor means 49. The pin 47 forms a part of the end portion of the piston 51 of a hydraulic or air cylinder 50 which is attached beneath the molding apparatus 10. The cylinder 50 is positioned and the length of the piston 51 and the pin 47 is proportioned such that the plug attachment 40 is extended between the mold halves 14a and 14b and is positioned in alignment with the cavity 45, when the piston 51 is fully extended from the cylinder 50, as generally illustrated in FIG. 11.

The operation then is generally as described above in that a parison 24 in the form of a hollow tube is extruded to extend between the mold halves 14a and 14b of the split mold 14. However, in this case, the parison 24 is extruded to extend below and about the plug attachment 40, so that the latter is contained therein, as shown in FIG. 11. The mold halves 14a and 14b are closed.

As can be best seen in FIG. 12, the lower portion of the parison 24 which surrounds the plug attachment 40 is pinched closed by the coaction of the walls of the mold cavity 45 and the plug attachment 40, in generally the same manner as it would be if the plug attachment 40 were a core pin or the like instead of an auxiliary component. However, in this case, the plug attachment 40 is integrally molded as a part of the container, by this described action.

Furthermore, with the lower end portion of the parison 24 being pinched closed in this manner, the container 30 can now be formed, by means of a blast of compressed air, and then filled and sealed, in the manner described above.

The mold halves 14a and 14b are formed with cutting edges 53 and 54 which engage about the pin 47, as illustrated in FIG. 12, to either score or to cut or trim off the waste portion of the parison. The plug attachment 40 then is completely contained within the container 30, except for an area of the base corresponding substantially to the diameter of the pin 47, as can be best seen in FIG. 8.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

What is claimed is:

1. A method of automatically forming, filling and sealing a container to provide a completely sterile product within the container and to simultaneously mold an auxiliary component as an integral part of the container, all in a continuous automatic operation comprising the steps of:

a. providing a split mold having mold halves having therein a container forming cavity and a second cavity proportioned to receive therein said auxiliary component;

b. supporting said auxiliary component atop of pin means by a vacuum extended through a bore in said pin means, said pin means being extendable into and out of between said mold halves;

c. extending said pin means to position said auxiliary component between said mold halves and in alignment with said second cavity so as to be received therein when said mold halves are closed;

d. extruding a parison in the form of an elongated hollow tube between said mold halves to extend about and below said auxiliary component;

e. providing cutting edges on said mold halves which engage with said pin means for trimming off the excess parison below said auxiliary component when said mold halves are closed;

f. closing said mold halves about said parison to thereby confine a portion of said parison therebetween in said container forming cavity in said split mold and to compress the lower portion about said auxiliary component within said second cavity to mold said auxiliary component as an integral part of said container when the latter is formed and to close the lower end of said parison to permit it to be blown to form said container;

g. severing said parison to provide an opening into the other end thereof for receiving a composite filling and blowing tube;

h. extending said composite filling and blowing tube into said opening into said parison;

i. blowing said parison to form said container and filling said blown container with a product;

j. retracting said composite filling and blowing tube from said opening into said parison;

k. providing forming and sealing means for closing the open end of said parison to hermetically seal the blown and filled container;

l. operating said forming and sealing means to hermetically seal the blown and filled container; and m. opening said mold halves to remove said formed, filled and hermetically sealed container with the auxiliary component integrally molded therewith from said split mold.

* * * * *